United States Patent
Lucero

[19]

[11] Patent Number: 5,959,277
[45] Date of Patent: *Sep. 28, 1999

[54] GAMING MACHINE SYSTEM OPERABLE WITH GENERAL PURPOSE CHARGE CARDS

[75] Inventor: James L. Lucero, Arcadia, Calif.

[73] Assignee: Scotch Twist, Inc., New York, N.Y.

[*] Notice: This patent is subject to a terminal disclaimer.

[21] Appl. No.: 09/112,691

[22] Filed: Jul. 9, 1998

Related U.S. Application Data

[63] Continuation of application No. 08/717,259, Sep. 20, 1996, Pat. No. 5,811,772, which is a continuation-in-part of application No. 08/430,354, Apr. 28, 1995, Pat. No. 5,559,312, which is a continuation-in-part of application No. 08/060,277, May 11, 1993, Pat. No. 5,457,306, which is a continuation-in-part of application No. 07/950,980, Sep. 23, 1992, abandoned, which is a continuation of application No. 07/740,814, Aug. 6, 1991, abandoned, which is a continuation of application No. 07/453,991, Dec. 19, 1989, Pat. No. 5,038,022.

[51] Int. Cl.[6] .............................. G06F 15/44; G06F 15/21
[52] U.S. Cl. .............................. 235/380; 902/23; 463/25; 463/29
[58] Field of Search .................................. 235/375, 380; 902/23; 463/25, 29, 41

[56] References Cited

U.S. PATENT DOCUMENTS

| | | |
|---|---|---|
| 4,322,612 | 3/1982 | Lange . |
| 4,335,809 | 6/1982 | Wain . |
| 4,339,798 | 7/1982 | Hedges et al. . |
| 4,467,424 | 8/1984 | Hedges et al. . |
| 4,575,622 | 3/1986 | Pelligrini . |
| 4,594,663 | 6/1986 | Nagata et al. . |
| 4,636,951 | 1/1987 | Harlick . |
| 4,639,889 | 1/1987 | Matsumoto et al. . |
| 4,648,600 | 3/1987 | Olliges . |
| 4,652,998 | 3/1987 | Koza et al. . |
| 4,669,596 | 6/1987 | Capers et al. . |
| 4,669,730 | 6/1987 | Small . |
| 4,674,055 | 6/1987 | Ogaki et al. . |
| 4,674,618 | 6/1987 | Eglise et al. . |
| 4,675,515 | 6/1987 | Lucero . |
| 4,689,742 | 8/1987 | Troy et al. . |
| 4,727,243 | 2/1988 | Savar . |
| 4,812,805 | 3/1989 | Lachat et al. . |
| 4,815,741 | 3/1989 | Small . |
| 4,842,278 | 6/1989 | Markowicz . |
| 4,884,212 | 11/1989 | Stutsman . |
| 5,038,022 | 8/1991 | Lucero . |
| 5,179,517 | 1/1993 | Sarbin . |
| 5,265,874 | 11/1993 | Dickinson . |
| 5,457,306 | 10/1995 | Lucero . |
| 5,559,312 | 9/1996 | Lucero . |
| 5,811,772 | 9/1998 | Lucero ................................ 235/380 |

FOREIGN PATENT DOCUMENTS 244274  12/1995  New Zealand .

OTHER PUBLICATIONS

"New Australian Gaming Complexes Usher In Era of Cashless Card–Based Wagering", Card News, p. 3, Jun. 6, 1988.
Ringer, R., "Casino Machines to Accept Debit Cards", American Banker, vol. 148, May 3, 1983.
"Legislation Takes Cash Out of Casinos" Las Vegas Sun, Apr. 2, 1985.

*Primary Examiner*—F. L. Evans
*Attorney, Agent, or Firm*—Cooper & Dunham LLP

[57] ABSTRACT

A player feeds a general purpose charge card, such as a VISA, MasterCard or AMERICAN EXPRESS card, or an account identification to a reader at a gaming machine or enters on a keyboard or other input device, information relating to the general purpose charge card or account identification for transmission to a transaction processing facility. The processing facility associates the account information with a gaming account and determines whether to grant a user request. If the request is granted, the gaming machine is enabled and thereafter one or more running net credit balances are kept by accounting for win-lose-draws. After the playing session is over, net playing credit information is automatically transmitted to the transaction processing facility.

30 Claims, 7 Drawing Sheets

CREDIT PLAY AT MACHINE N, CASINO M?
Y

READ PLAYER'S CARD — 80
VALID CARD?
Y
ENTER PIN (OPTIONAL) — 82
VALID PIN? — 84
Y
ENTER AMOUNT OF REQUESTED PLAYING CREDIT — 86
CREDIT REMAINS FROM PREVIOUS TRANSACTION? — 88
Y
PROCESS REMAINING PLAYING CREDIT — 90
PLAYER APPROVAL? — 92
Y
PLAYER OF CREDIT GRANTED? — 94
Y
DISPLAY BALANCE AVAILABLE FOR PLAY OR PAYOUT AT MACHINE N — 96
PLAY ENABLE — 98
CREDIT REQUEST AT ADDITIONAL MACHINE? — 100
Y
PLAYER'S CREDIT BALANCE POSTIVE? — 102
Y
ENABLE ADDITIONAL MACHINE — 104
DETECT PLAY WIN OR LOSE, PAY-OUT REQUESTS, — 106
   ADDITIONAL CREDIT REQUESTS, END PLAY REQUESTS
UPDATE BALANCES (MACHINE, CASINO, PLAYER) — 108
DISPLAY UPDATED BALANCE — 110
CLOSE OUT REQUESTS FOR MACHINE, CASINO, DAY — 112
COMPUTE DAILY BALANCE — 114
PROCESS CLOSE OUT REQUESTS PER MACHINE, CASINO, PLAYER — 116
POST DAILY BALANCE TO CREDIT CARD PROCESS FACILITY — 118
PROCESS BALANCE AT CREDIT CARD PROCESS FACILITY — 120

FIG. 5

| | | |
|---|---|---|
| GAMING ACCOUNT IDENTIFICATION | | 162 |
| | LINKED ACCOUNT #1 IDENTIFICATION | 164 |
| | LINKED ACCOUNT #2 IDENTIFICATION | |
| | ⋮ | |
| | LINKED ACCOUNT #N IDENTIFICATION | |
| GAMING ACCOUNT STATUS | | 166 |
| | CREDIT LIMIT | 168 |
| | BALANCES | 170 |
| | | DOLLARS | 172 |
| | | BONUS POINTS | 174 |
| | | WAGERING TIME | 176 |
| | ⋮ | |
| | PLAYER IDENTIFICATION, IF ANY | 178 |
| | OTHER INFORMATION , IF ANY | 180 |
| | LINKED ACCOUNT #1 STATUS | 182 |
| | | CREDIT LIMIT | |
| | | CREDIT APPROVED | 184 |
| | | BALANCE | 186 |
| | | OTHER INFORMATION | |
| | ⋮ | |
| | LINKED ACCOUNT #N STATUS | |
| | | CREDIT LIMIT | |
| | | CREDIT APPROVED | |
| | | BALANCE | |
| | | OTHER INFORMATION | |

GAMING MACHINE SYSTEM OPERABLE WITH GENERAL PURPOSE CHARGE CARDS

REFERENCE TO RELATED APPLICATIONS

This application is a continuation application of Ser. No. 08/717,259 filed on Sep. 20, 1996, now U.S. Pat. No. 5,811,772 which in turn is a continuation-in-part application of Ser. No. 08/430,354 filed on Apr. 28, 1995 now U.S. Pat. No. 5,559,312, which in turn is continuation-in-part application of Ser. No. 08/060,277 filed on May 11, 1993, now U.S. Pat. No. 5,457,306 which in turn is a continuation-in-part of Ser. No. 07/950,980 filed on Sep. 23, 1992, now abandoned, which in turn is a continuation of Ser. No. 07/740,814 filed on Aug. 6, 1991 and now abandoned, which in turn is a continuation of Ser. No. 07/453,991 filed on Dec. 19, 1989 and now U.S. Pat. No. 5,038,022. Said parent applications are hereby incorporated by reference in this application in their entirety as though fully set forth herein.

TECHNICAL FIELD

The invention relates to gaming in general and in particular to using charge cards such as, for example and without limitation, VISA, MasterCard or American Express charge cards, and bank account access cards, to operate gaming machines such as, for example, slot machines. A visual display, a keyboard, and a card reader (or a device such as a keyboard, touch screen or the like for entering card and personal identification information) are associated with the gaming machine to provide playing credit to the player upon approval of the player's charge card. The terms general purpose charge card, or charge card for short, are used herein to distinguish from a prior art "house card" of the type issued for use only in a specified gaming establishment. A charge card can be a credit card (the card owner is given credit and is billed later) or a debit card (the card owner's account is debited), or some other billing and/or paying arrangement can be made between the issuer and the owner of the general purpose credit card.

BACKGROUND OF THE INVENTION

Casinos and certain other business establishments have gaming machines such as, for example only and without limitation, slot machines in which a player can insert coins, pull a handle, and hope for a winning combination of elements on spinning wheels to allow him or her to win money from the machine. These are games of chance that some individuals play for entertainment and others with the hope of receiving winnings.

Casinos typically have cashiers at windows where patrons can obtain coins or tokens to play the gaming machines. A player who runs out of coins or tokens while at a gaming machine must walk away from the machine and find a cashier to get more coins or tokens, and the player may or may not resume playing. Even if wishing to resume, the player may lose his or her place at the previously chosen machine, and some players find this annoying, e.g., because a player feels that a machine was ready for "payoff" or that the player was on a "roll" on that machine but had to discontinue play to go replenish the supply of coins or tokens. These prior systems therefore disrupt the playing of the machine in a manner which is undesirable for the casino and may also be undesirable from the standpoint of the player.

It has been proposed to use house charge cards which differ from general purpose charge cards in that they are issued by a particular gaming establishment and have restriction on use peculiar to that establishment. Such house cards would avoid the need to get coins or tokens from the cashier or to cash in coins and tokens but still would require a player who does not have such a house card to go through the procedures for obtaining one, and would tend to limit a player to the one or more establishments that have already provided that particular player with a house card.

In addition, the player would have to comply with the restriction imposed on house card use by the issuing casino, e.g., would have settle the account for each house card according to the rules of the particular establishment that issued the card.

SUMMARY OF THE INVENTION

The invention relates to gaming machines and systems and particularly to a system and a method that make it possible for a player to participate in games of chance at casinos and other gaming establishments by using a general purpose charge card rather than a house card, and to a system and a method that provide a particularly efficient way for the player to obtain playing credit with a general purpose charge card, to use the playing credit and have it updated to account for wins, losses and draws from games of chance played at one or more machines at one or more casinos, and to ultimately have the player's account at a remote financial institution credited or debited and the account of the playing establishment or establishments credited or debited during and/or after a playing session.

In a particular example of the invention, which is not a limitation on the scope of the invention, a player supplies a general purpose charge card to a gaming machine at a casino, e.g., by feeding the card to a conventional magnetic card reader. The card reader reads selected information from the charge card, transmits it over a data link for validation, e.g., to the card issuer and, upon receiving back a validation over the data link, requests a personal identification number (PIN) from the player. The player enters the PIN, e.g., through a keypad, a touch screen or a keyboard at the gaming machine, which in an alternative embodiment can also be used to manually enter information that would otherwise be read from the card by the card reader. If the PIN is similarly validated, the gaming machine prompts the player to enter an amount of requested playing credit, e.g., through a display or by a voice message. The player enters an amount of requested credit, and the system determines whether to grant that requested credit on the basis of selected criteria. The determination may be made through another communication with the card issuer, or it can be made on the basis of some other criterion, such as whether the requested amount conforms to a selected threshold. Upon approval of the requested credit, or of some other amount of playing credit, the gaming machine displays to the player the amount of granted playing credit available for play or pay-out at that gaming machine and enables the gaming machine to use said playing credit for plays. The player then plays on that machine, and the system detects those plays and win/lose/draw results therefrom, as well as any pay-out requests by the player and any end-of-play requests by the player. The system maintains and updates credit balances for the gaming machine, for the player and for the casino in response to the detected play results, pay-out requests and end-of-play requests, and displays at least the updated balance for the player at the gaming machine. The system posts a daily balance for at least the player to a credit process facility, and processes the balances to update accounts for the player and for the casino with the card issuer.

In addition, the system determines if any playing credit remains for the player from a previous transaction, and takes such remaining credit into account in the step of determining whether to grant the requested playing credit. Still in addition, the player can request additional playing credit, in which case the system goes through a similar validation process, and the player can request the use of playing credit at one or more additional gaming machines. If the request for such additional machines is granted, the system takes plays or requests for pay-outs and end-of-play requests at such additional gaming machines into account in maintaining said balances.

One object of this invention is to provide a method, and apparatus for performing the method, of using information concerning an account maintained at an institution for use in playing games of chance played on a gaming machine at a location which is remote from and is different from the institution, having the steps of: (1) causing information concerning the account to be received by the gaming machine; (2) accessing a gaming account at a processing facility based on information concerning the account; (3) conditioning the gaming machine in accordance with the gaming account to permit plays; (4) maintaining information about the plays on the gaming machine; and (5) selectively causing the gaming machine to transmit information respecting the plays to the processing facility for maintaining the gaming account.

This invention also includes a method having one or more of the following additional steps, and apparatus for performing the steps of: (a) requesting a playing credit through the gaming machine based on the account, determining whether to grant the playing credit, and only permitting plays on the gaming machine if the playing credit is granted; (b) crediting or debiting monetary or non-monetary units to gaming subaccounts of the gaming account for each play on the gaming machine; (c) exchanging one or more units of one subaccount for one or more units of another subaccount; (d) determining, and crediting to a subaccount, the amount of time the gaming machine is accessed or the amount of money wagered on the gaming machine; (e) opening a gaming account by accessing the gaming account; (f) linking one or more accounts maintained with the gaming account by causing information concerning the account and one or more second accounts to be received by the gaming machine; (g) selectively causing the gaming machine to transmit information respecting said net playing credit to the processing facility for use in maintaining the account at the institution; (h) selecting an option for accessing the gaming account, the option being a request for: credit, account linkage, monetary or non-monetary wagering unit, activity monitoring or gaming account information change; and (i) selecting a default accessing option automatically when plays are performed on said gaming machine without an explicit selection. The wagering units can be frequent flyer miles, credit card bonus points, customer bonus points, and free sample gaming points.

Another object of the invention is to provide a gaming account having: a gaming account identification, one or more linked account identifications, gaming account status information, and linked account status information. The gaming account status information and the linked account status information may include: a credit limit, one or more subaccounts, a player identification, and other information. Also, the subaccounts may have denominations of different monetary and non-monetary wagering units.

BRIEF DESCRIPTION OF THE DRAWINGS

Features of the invention are illustrated in the accompanying drawings in which like numerals represent like elements and in which:

FIG. 5 is another flow chart illustrating processing steps in obtaining and using playing credit in a gaming system and process;

FIG. 9 is a diagrammatic representation of a variable length record for a gaming account.

DETAILED DESCRIPTION

Gambling casinos and gaming parlors typically include a variety of gaming machines such as slot machines, poker machines which play a card game and other types of machines. Some of these machines dispense coins or tokens as the player obtains a winning combination while in others credit is obtained and indicated on the machine. The player can use the credit to continue to play the machine or the credit can be converted to cash by a cashier in the casino. In such cases, a display of some type, such as a liquid crystal display, may indicate the credit available on that particular machine. However, when the credit has been used and none remains, the player must then insert more coins or tokens in order to continue playing. If that occurs, the player must leave the machine, find a cashier and then obtain more coins or tokens with which to operate the machine. In such case, the player returning to the machine may find it occupied by another player. This may be particularly frustrating to a player who believes that a particular machine is about ready for a "payoff" or that the player is on a particular lucky streak with that machine.

Figure 1:
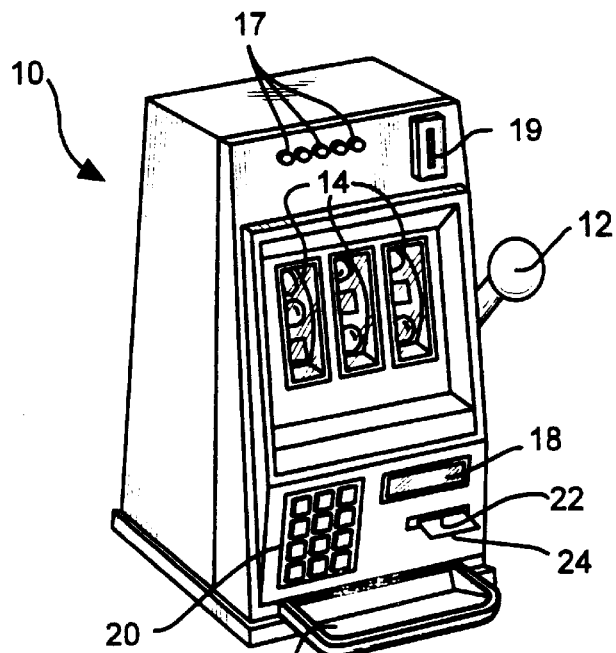
FIG. 1 is an isometric view of a gaming machine, such as a slot machine, operating in accordance with the invention for a player to obtain and use playing credit.

The gaming machine 10 illustrated in FIG. 1 includes features of the invention which enable a player to obtain credit, without having to leave the machine, with the use of a general purpose charge card such as, without limitation, a VISA, American Express or MasterCard card, or a bank account access card. In addition, other cards of the type having a prearranged amount of credit (or available debit) from a remote financial institution may be used. Each time such a charge card is used, the amount of credit available is reduced by the amount used until the granted credit is totally depleted. Such a charge card is discussed in, e.g., U.S. Pat. No. 4,575,622.

The machine 10 has indicators 14 which indicate to the player certain patterns or indicia. Particular combinations of these patterns are designated as winning combinations. The player inserts coins or tokens in a slot such as a slot 19, activates the machine by pulling the handle 12, pushing buttons or taking some other action, and observes the indicators in the displays 14 to determine if a winning combination is obtained. If so, the display 18 may indicate the amount won as a credit which the player may use to continue playing the machine without inserting additional coins or tokens. A player can elect to receive cash or tokens for the credit available, and the appropriate value is obtained either by coins or tokens dropped or dispensed into a slot or tray 16 or the credit is redeemed from a cashier.

If the player has used all of the available coins, tokens or credit won by playing the machine, or if the player wishes not to use coins or tokens at all, the present invention enables the player to obtain playing credit, or further playing credit, without leaving the machine by inserting a general purpose charge card 24 into a slot 22 or by keying in information similar in effect to that which would be read from the card by the card reading device, such as the card number. The charge card may be swiped through a groove instead of being inserted in a slot, as is known in the pertinent technology. The amount of playing credit desired is entered through the keyboard 20. The reader 26 associated with the machine 10 transmits from the card the information concerning the player to a remote location such as, for example, the player's financial institution, along with a first code 27 identifying the gaming machine and, if necessary, a second code 29 identifying the establishment where the machine is located, and any further information that may be desired. The financial institution may then credit the establishment's account and debit the player's account in the amount entered into the keyboard. In an alternative system, the gaming machine 10 may issue a credit slip indicating the amount of credit obtained and which may be signed by the player, given to a casino employee and kept by the casino for return to the player's financial institution for proper credit. Of course, the playing credit can be a pre-arranged amount, or an amount that is subject to selected restrictions and conditions.

Figure 2:
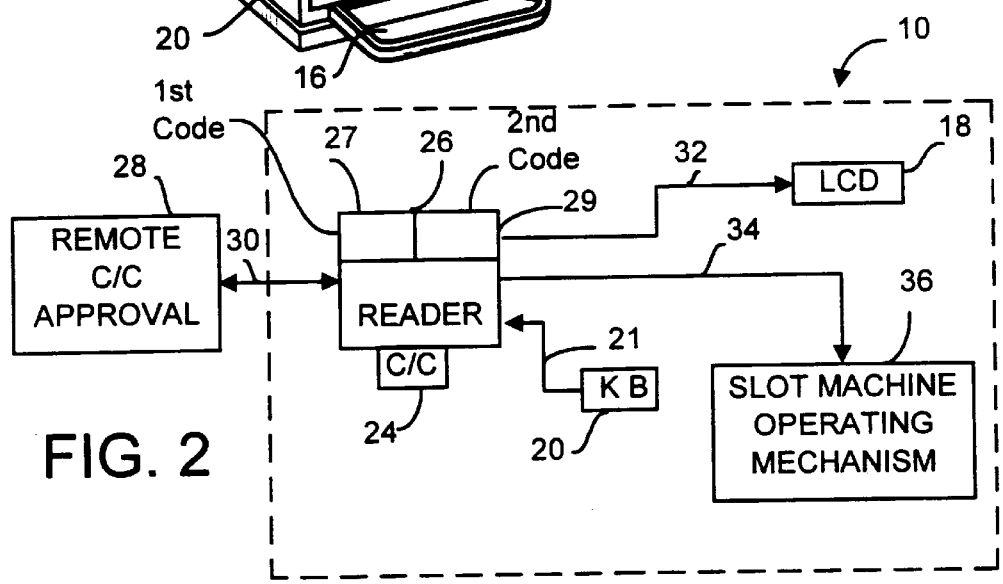
FIG. 2 is a diagrammatic representation of a circuit used in obtaining playing credit.

As shown in block diagram form in FIG. 2, the gaming machine 10 includes a card reader 26 having a slot or groove in which the charge card 24 is inserted as illustrated in FIG. 1 or through which the charge card may be swiped. The reader 26 is coupled with a remote card approval financial institution 28 where it is determined if the charge card is entitled to the credit requested and, optionally, if the person requesting playing credit is the rightful user of the card and meets any other conditions for the grant of the requested playing credit. Status of the card is returned over line 30 to reader 26 where status information is supplied to the liquid crystal display 18 on line 32. If the card is invalid, or the person requesting the playing credit is not entitled to it, the display so indicates. If the card is acceptable for the amount of credit desired, the liquid crystal display 18 gives instructions on making use of the credit through the use of the keyboard 20. The information generated through the keyboard 20 is coupled on line 21 to reader 26 which provides the necessary signals on line 34 to the gaming machine operating mechanism 36 to allow the player to use the credit by operating the gaming machine. As indicated earlier, the gaming machine operating mechanism 36 is already in existence and is used by players where credit is accumulated from winnings on the machine and the player simply continues to play the machine using the available credit that has been previously won.

In this case, the credit approved by the remote financial institution is transferred to the machine and the machine operates in a well known manner to allow the player to continue to use the credit indicated, or the approved credit is transferred to an intermediate processing system where information pertaining to that credit is stored and can be accessed and updated as the player uses the credit so that the intermediate processing system can keep the updated status of the credit for some period of time, thus reducing the number of times the remote financial institution would be accessed in connection with the approved credit. Thus, with the novel features of the invention forming part of the gaming machine as illustrated in FIG. 1, the player does not need to leave the machine to obtain further credit, but simply inserts the charge card in slot 22 or swipes the card in the appropriate slot, enters the desired credit amount through keyboard 20 and when the remote institution has approved the credit, the machine indicates the amount of credit obtained and allows the player to continue to play the machine with the credit that was so obtained. When an intermediate processing system is used, located functionally between the gaming machine and the remote financial institution, that intermediate system maintains a net playing credit by initially receiving and recording in memory information regarding the approved credit, then communicating with the gaming machine to receive therefrom information respecting the win/lose/draw plays to keep track of a net playing credit, and communicating information respecting the net playing credit as needed to the remote financial institution. In this embodiment, the intermediate processing system serves as a processing facility which is different from and typically is remote from said financial institution.

As stated previously, a card reading device may be used which allows the card to be swiped through a slot 22 where it is automatically read and the same procedure is followed to obtain the credit. Further, where a debit-type charge card is used, it would not be necessary to sign any credit slip since the unique code identifying the establishment and the unique code identifying the gaming machine are transmitted to the remote institution along with the player's identification and the proper debits and credits take place automatically. Still further, the player may be asked through the display to provide further identification such as, by way of an example only and without limitation, a PIN (personal identification number) code through keyboard 20.

Figure 3:
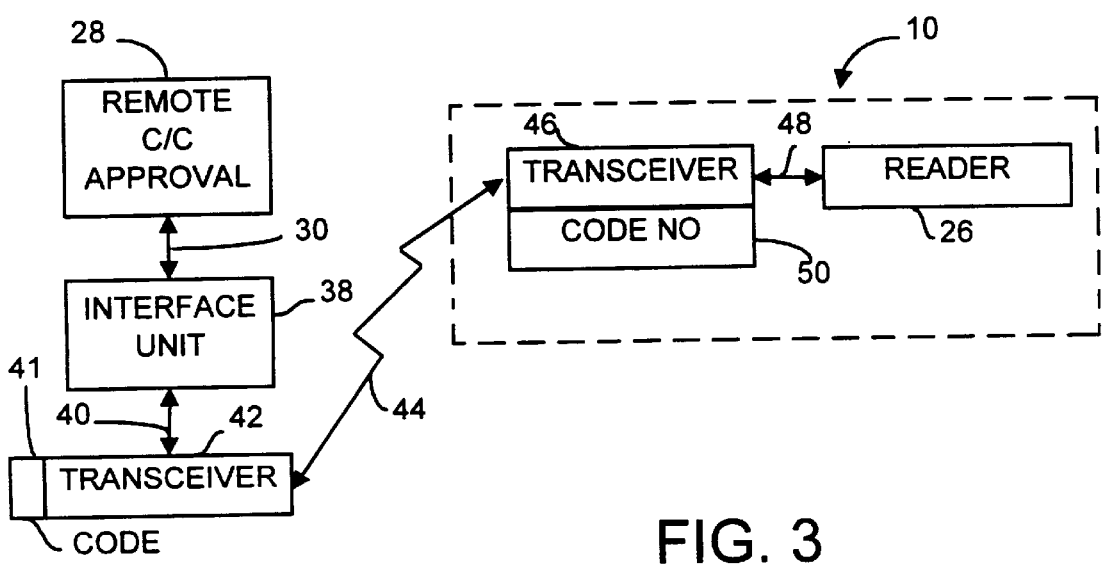
FIG. 3 is a diagrammatic representation of an alternate circuit for remotely communicating with the credit obtaining circuitry at the gaming machine.

In order for features of the invention to be used with the machine shown in FIG. 1, the necessary cabling or other communications link must be connected to the machine. If cabling is used, the machine has a fixed location and it cannot be moved conveniently because a move would involve disconnecting all of the cables and reconnecting them at a new location. In order to make the machine more easily movable, the invention may be modified as illustrated in FIG. 3 which is a block diagram representation of an alternate version in which a transceiver 46 is associated with the reader 26 shown in FIG. 2. The machine 10, in this case, need not be located in any particular fixed location, but can be conveniently moved as necessary to any desired location. In such case, the incoming signals from the financial institution such as those approving the card are coupled on line 30, which may be, for example, a telephone line, to an interface unit 38 in the casino. The interface unit couples the incoming signals to transceiver 42 on line 40. Transceiver 42 sends the signals through the air into a corresponding transceiver 46 in the gaming machine. The output of the transceiver is then coupled to reader 26 shown in FIG. 2, and the system operates as described previously. A code unit 50 storing a unique code is associated with each transceiver 46 identifying the particular gaming machine 10 that is to receive the signal. Thus, only that particular gaming machine 10 will be addressed from transceiver 42 when multiple gaming machines are being serviced in the same establishment. Such coding techniques are well known in the art. The unique codes may be assigned such that not only is the particular gaming machine 10 identified with its own code, but the establishment in which the machine is located may also be identified by a particular code 41 at transceiver 42, so that the remote financial institution approving the credit card has a record of not only the gambling institution, but also the particular gaming machine receiving the credit.

Figure 4:
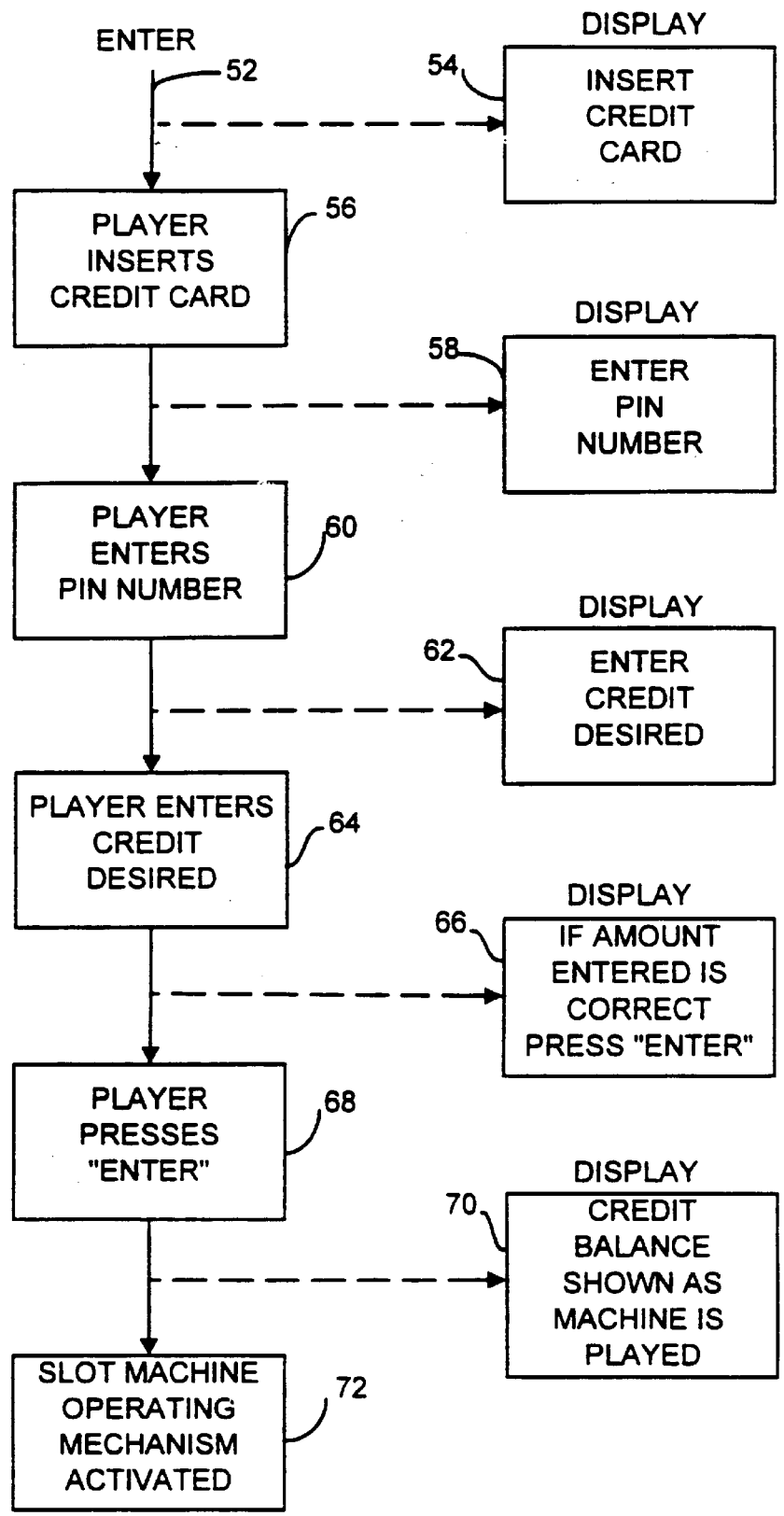
FIG. 4 is a flow chart illustrating steps taken by the player to obtain credit at the gaming machine without having to leave the machine.

FIG. 4 illustrates a flow chart of the operation of the reader 26 and associated circuits in the gaming machine 10. The system is entered at 52 by the player observing the display at 54 which may indicate, for example only, "INSERT CREDIT CARD". At step 56, the card is inserted in slot 22, or is swiped through a slot, and the display is observed at step 58. The display may show, for example only, a request for the entry of a PIN number. At step 60 the player enters the PIN number through the keyboard, and the display may indicate at 62 "ENTER CREDIT DESIRED". The player then enters the credit desired through the keyboard at step 64 and the display may indicate the amount entered and state "IF AMOUNT ENTERED IS CORRECT, PRESS ENTER". That is indicated at step 66. At step 68, the player presses the enter key and the display, at step 70 indicates the credit balance that was approved. As the machine is played the credit balance is reduced or increased. Thus if $10.00 is indicated as the credit obtained, and each play of the machine costs $1.00, the credit balance as shown will decrease by $1.00 each time the machine is played until the credit balance is zero or is altered by winnings obtained by the player. At step 72, the slot machine operating mechanism is activated so that the player can continue playing the machine. Actuators 17 enable the player to accept odds in a well-known manner. The player can select patterns diagonally or across or bet variable amounts of credit with each play with the use of the actuators 17 in a well-known manner.

Thus, there has been disclosed a novel apparatus and method of enabling a gaming machine to provide credit to a player operating the machine without leaving the machine. The player simply inserts or swipes a general purpose charge card in or through the reader and enters through the keyboard the amount of credit desired, and the financial institution at a remote distance from the machine approves or denies the credit which is indicated on the display on the machine itself. When the credit is obtained, the machine allows the player to use that credit in playing the machine without the player having to leave the machine to obtain the credit. The play transactions are processed and the ultimate debit or credit to the player's account in the financial institution and billing to the player are made in accordance with the invention.

Figure 6:
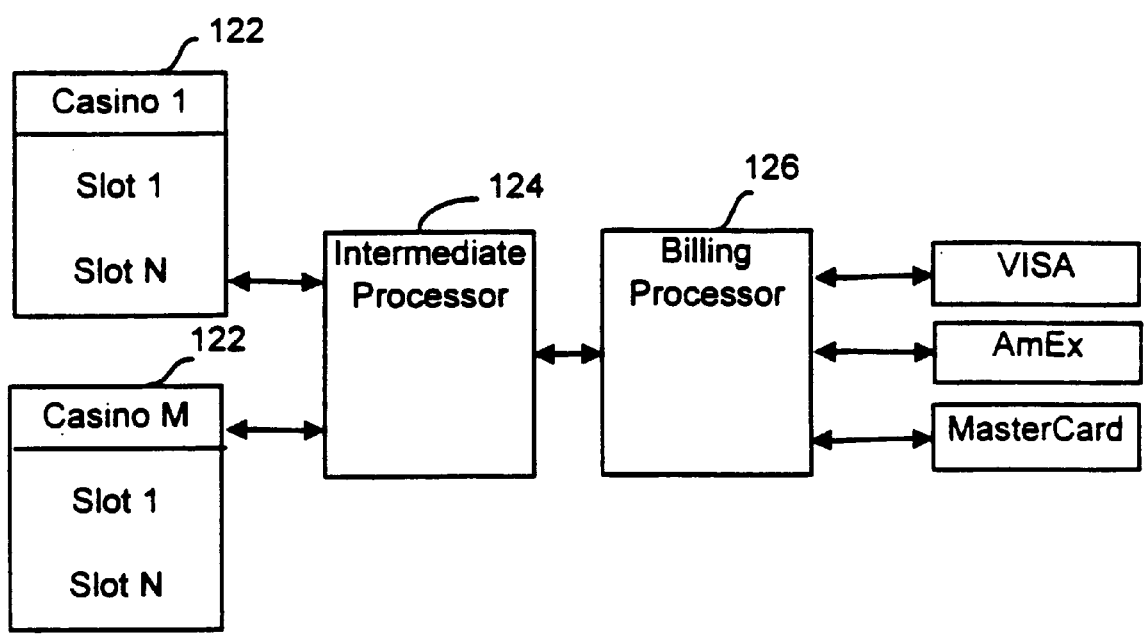
FIG. 6 is a diagrammatic representation of a circuit for obtaining credit through an intermediate processor.

Referring to FIG. 5, at step 80 a player supplies a general purpose charge card to a gaming machine at a casino, e.g., by feeding the card to a conventional magnetic card reader. The card reader reads selected information from the charge card, transmits it over a data link for validation, e.g., to the card issuer and, upon receiving back a validation over the data link, requests a personal identification number (PIN) from the player. At step 82, which can be an optional step, the player enters the PIN, e.g., through a keypad or a keyboard at the gaming machine. If the PIN is similarly validated at step 84, the gaming machine prompts the player to enter an amount of requested playing credit, e.g., through a display or by a voice message. The player enters an amount of requested credit at step 86, the system checks at step 88 if any credit remains for the player from a previous transaction and processes such remaining credit at step 90. Upon player approval at step 92 of the processing up to that point, the system determines at step 94 whether to grant that requested credit on the basis of selected criteria. The determination may be made through another communication with the card issuer, or it can be made on the basis of some other criterion, such as whether the requested amount conforms to a selected threshold. Upon approval of the requested credit, or of some other amount of playing credit, the gaming machine at step 96 displays to the player the amount of granted playing credit available for play or pay-out at that gaming machine, and at step 98 enables the gaming machine to use said playing credit for plays. The player at step 100 can similarly request playing credit for one or more additional gaming machines and, upon approval by the system at step 102, such one or more additional gaming machines are enabled at step 104 for play by that player. The player plays the enabled machines, and the system at step 106 detects those plays and win/lose/draw results therefrom, as well as any pay-out requests by the player and any end-of-play requests by the player. The system maintains credit balances for the gaming machine, for the player and for the casino and at step 108 updates those balances in response to the detected play results, pay-out requests and end-of-play requests, and at step 110 displays at least the updated balance for the player at the gaming machine. The system at step 112 closes out requests for each enabled machine, as well as for the casino and the player, computes a daily balance at step 114, processes close out requests per machine, casino and player at step 116, and at step 118 posts a daily balance for at least the player to a credit process facility, where the balance is processed at step 120 for eventual use in the player's billing statement from the card issuer. The use of PIN number is optional. The system can be arranged to omit any use of a PIN number or to use some aid to identification other than a PIN number. The functional relation of the main elements of the system is illustrated in FIG. 6, where casinos 122, e.g., casinos 1 through M, each having gaming machines such as slot machines 1 through N, where M and N are positive integers, are connected through respective communication links with an intermediate processing system 124 which in turn is connected through respective communication links with remote financial institutions such as VISA, American Express and MasterCard. As described above, the remote financial institution approves a playing credit requested through a gaming machine at a casino or other gaming establishment, and intermediate processing system 124 keeps track of the net playing credit as the player plays games of chance, so that the remote financial institution can be accessed fewer times, e.g., only when the player ends playing or at a specified time, e.g., at closing time for the day, and any charge for the play can be communicated to the remote financial institution as a single line item for the day or the playing session even if it resulted from a great number of plays each changing the then current net playing credit. Still in addition, a bill processing facility 126 can be functionally interposed between the intermediate processing system and the remote financial institutions to accumulate information respecting the net playing credit as needed so that information defining a single line item on a player's bill from the remote financial institution can be supplied to the remote financial institution rather than accessing the remote financial institution more frequently.

Figure 7:
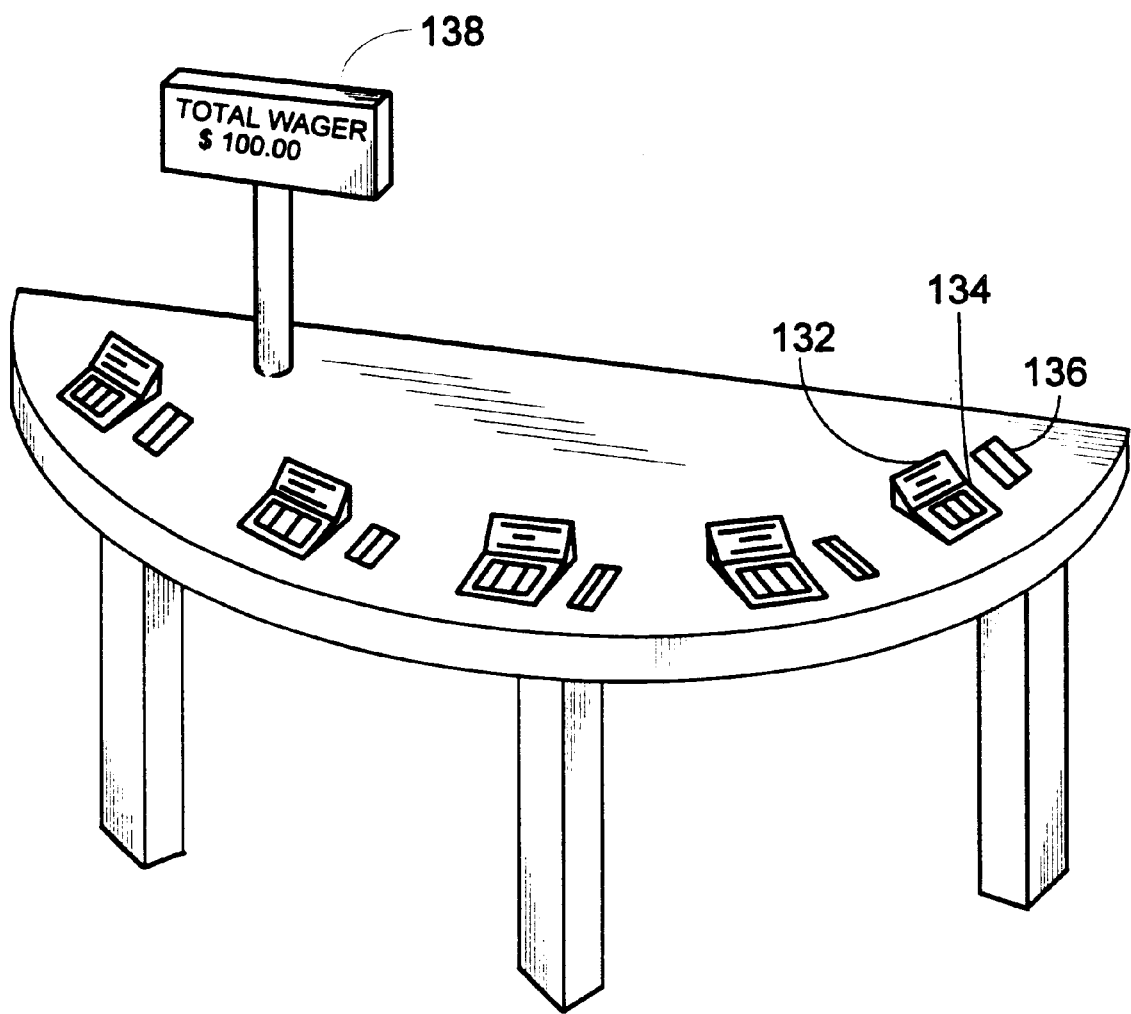
FIG. 7 is an isometric view of a multiple player gaming machine table.

As illustrated in FIG. 7, this invention also includes the use of credit obtained in accordance with this invention and of net playing credit in a multiple player game which can be played at a game table, such as poker. In this embodiment, each player participating in the game has a display 132, an input device 134 such as a keyboard or touch screen and, optionally, a card reader 136 through which playing credit can be obtained using a general purpose charge card in accordance with this invention. Each player's display and/or a separate display 138 at the table which is visible to all the players, shows the total amount of the wagered playing credit from all the players, that is, the "pot" and may also show individual player wagers, that is, each "bet". To make wagers, the player can enter the amount to wager on the input device. If the player wins, the player's net playing credit is increased by the amount in the pot, less any commission taken by the gaming operator which is credited to the gaming operator's account. The gaming operator may or may not be the owner of the particular establishment or location in which the gaming table or the participating players are located.

This invention also operates in a mixed environment, that is, some players can use the display and input device, other players can use cash or tokens, and still other players can use a combination. In such instances, the value of the wagered cash or tokens can be entered for display by the dealer, or the table may be equipped with a slot or other mechanism which automatically counts tokens or cash inserted therein, and the total pot can be tallied automatically for display. Similarly, payouts can be made electronically to a winning player's net playing credit or in tokens or cash.

Additionally, this invention provides that gaming machines for multiple players, as with gaming machines for individual players, desirably can be located in business establishments and similar locations where the receiving and dispensing of coins or tokens is impractical. For example, any establishment or location which provides facilities for a computer which has appropriate gaming software and which can be connected to a remote financial institution, directly or through intermediate computers, provides a gaming establishment where a player might play a multiple player game through the gaming machine. Since most computers with these capabilities, for example modem-equipped personal computers, personal digital assistants (PDAS) and portable computers, typically do not have any way to receive or dispense coins or tokens, this invention provides that where the computer is serving as part of the gaming machine in a-multiple player game, the computer can connect to a processing facility of the gaming operator and then directly or through other intermediate processing facilities to each of the players' remote financial institutions to obtain playing credit from each player's respective general purpose charge card. Alternatively, a player can connect directly to the remote financial institution and have the remote financial institution provide the credit approval to the gaming operator's processing facility. Once a computer is connected to the gaming operator's processing facility, the processing facility provides the means for each player to effect one or more of the following: (1) to obtain playing credit from the player's remote financial institution in accordance with this invention using a general purpose charge card; (2) to have a net playing credit maintained electronically; and (3) to have information about the game being played sent to and received from the processing facility. The game play information which is exchanged between the processing facility and a player's computer allows for additional capabilities. For example, the processing needed to emulate a mechanical gaming machine, such as wheel spinning for a slot machine, can be performed by either the processing facility or the player's computer.

Multiple player games are possible where the processing facility is connected to multiple gaming machines at the same time and where the processing facility receives game play information from each of these gaming machines. In fact, because players in different establishments or locations can be connected to the processing facility, the game operator can, in effect, create "electronic gaming tables". Thus, such computer based multiple player gaming machines can be used from virtually any location so long as a connection to the processing facility is provided for each player. In addition, using mobile communications such as cellular telephones, one or more of the multiple players and respective gaming machines can be in motion, such as on a transportation vehicle, while the game is played.

The operation of a gaming machine for multiple players according to this invention can be illustrated by the following example of a passenger/player in a transportation vehicle. If the passenger wishes to play, the passenger can connect to a processing facility by a touch screen display panel or the like provided at the passenger's seat or by using a portable computer with appropriate software and a mobile communication device such as a cellular telephone. Once connected to the processing facility through the gaming software, the player can transmit a general purpose charge card number and/or other identification information such as the charge card's expiration date to request playing credit. Alternatively, the charge card can be read by a charge card reader provided at the passenger's location. Once the request is received, the processing facility, which can be a computer on-board the vehicle, determines what playing credit approval is needed to be obtained from a financial institution. In such a case the on-board processing facility calls from an on-board telephone or other communication system to either another intermediate processing facility of the gaming operator which can call a remote financial institution or directly to the remote financial institution to obtain approval for the requested playing credit. Once approved, the on-board processing facility keeps track of the net playing credit so that any time during the trip the player wishes to play, the net playing credit can be used without having to seek new approval from the financial institution. Even if the passenger changes his or her seat, by entering the charge card or other identifying information, the net playing credit can be transferred to another gaming machine at the new seat or, if the player wants to operate several gaming machines at the same time, the net playing credit can be accessed simultaneously from multiple gaming machines. This procedure for obtaining credit is the same as for the individual player, however, once credit is approved, the passenger can request to participate in a multiple player game. In response, the on-board processing facility attempts to form an electronic gaming table by checking if other passengers have requested such a game. Alternatively, the passenger can specify which passengers are to be included in the multiple player game. If no other passengers on the same vehicle are available or choose to participate in a multiple player game, the onboard processing facility can connect with other processing facilities to identify players at other locations. Alternatively, or in addition, at the passenger's request, the processing facility can simulate other players using simulation software. During the trip and/or when the trip has ended, the on-board computer can contact the gaming operator's processing facility, and/or the remote financial institution to update a passenger's account and/or the gaming operator's account in accordance with the changes to the net playing credit.

Another aspect of this invention, is the automatic conversion of the net playing credit into the wagering unit of the gaming machine being played. On most gaming machines, the display and list of payouts are based on a wagering unit for that gaming machine, such as, 5 cents, 25 cents, one dollar, five dollars etcetera; for example, 4 wagering units of the 25 cents machine is one dollar. In a traditional casino, when a player wishes to play a gaming machine with a different wagering unit the player must first cash in the coins or tokens of one wagering unit and then obtain coins or tokens of the other wagering unit. This invention, instead, provides that the net playing credit can be requested and/or played in the wagering unit of the gaming machine into which the player has inserted the general purpose charge card. So for example, a $100 net playing credit will be displayed as 400 at a 25 cent wagering unit gaming machine, but will be displayed as 200 at a 50 cent wagering unit gaming machine. In one embodiment of the invention, the player can select to have the net playing credit displayed in either the wagering unit of the game machine being played, in the local currency or in the wagering unit of the player's choice.

Another embodiment of this invention allows the player to use the general purpose charge card to open and/or maintain a gaming account with the gaming operator from a gaming machine or from another machine at which the player can use the general purpose charge card to remotely access the processing facility. Although the gaming account, like the net playing credit, can be reconciled with the general purpose charge card at the financial institution at the end of a playing session, the gaming account also exists independently of the account at the financial institution and is accessed whenever the general purpose charge card is used.

Figure 8:
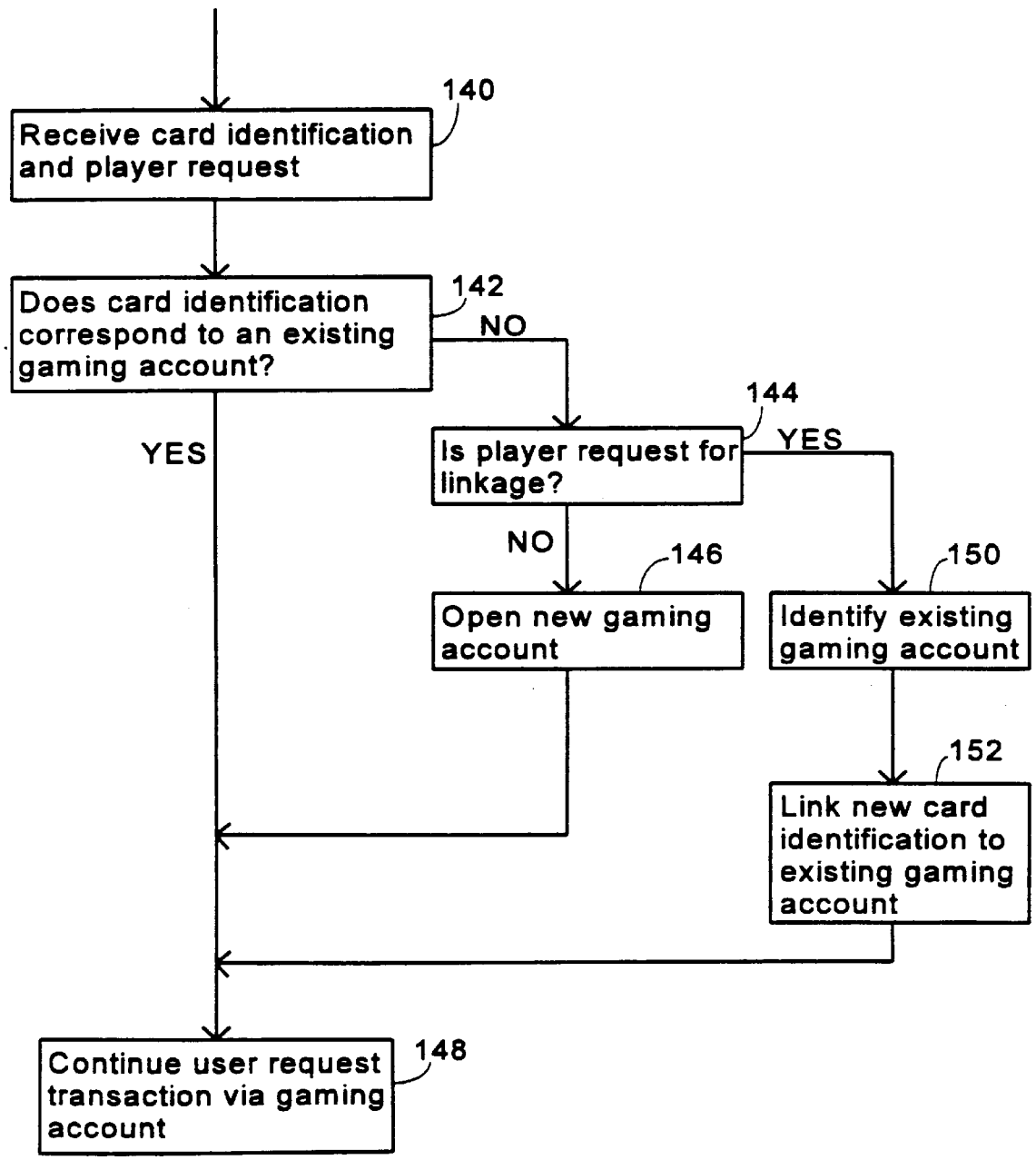
FIG. 8 is a flow chart illustrating processing steps in obtaining and using playing credit through a gaming account in a gaming system and process.

As illustrated in FIG. 8, in operation, the player enters the general purpose charge card account information, for example, by keying in the general purpose charge cardnumber or by swiping the card through a card reader. Upon receiving the general purpose charge card information 140, the processing facility uses the information to determine whether this general purpose charge card has been used before to establish a gaming account with the gaming operator 142. If no such gaming account is identified 142, 144, a new gaming account is opened 146. Such an account may have been established by earlier plays on a gaming machine of the gaming operator. However, if the gaming operator, for example a hotel, a ship or an airline, provides other services, the processing facility may already have received requests for credit based on the general purpose charge card, for example when a guest rents a room or a passenger purchases a ticket. This earlier information, in one embodiment, is used to open the gaming account. Also, the earlier information can be used by the processing facility to determine if credit approval/authorization should be granted 148. As the player uses the gaming machine, winnings are deposited in, or losses are withdrawn from, the gaming account. When the player has finished gaming, the processing facility can: (1) issue credit or debit the general purpose charge card account; (2) retain any credit or debit balance in the gaming account for subsequent use by the player; or (3) a combination of the two. Thus, for example, if a player has winnings of $100, the player could choose to credit the general purpose charge card account with $50 and to leave $50 in the gaming account for future use. Alternatively, the processing facility allows the gaming account to retain any credit or debit for a specified amount of time or until a specific event occurs, before crediting or debiting the general purpose charge card account.

Another aspect of this invention, uses the general purpose charge card account to track the player's gaming activity. Such tracking is used by gaming operators, such as casinos, for providing bonuses to the players, such as prizes and free accommodations. In such an environment, the identification information from a general purpose charge card is used with or without a request for credit to identify the player at a gaming machine without any transfer of credit or money. In this embodiment, the player inserts the general purpose charge card into the gaming machine and selects the option for activity monitoring only. Such an option can be displayed in addition to the request for credit option. For example, the player can select an option named "Preferred Player Bonus Program Only". Alternatively, the activity monitoring operation can be the default, that is, if a player enters the card identification and starts playing without requesting credit or another option, the activity monitoring only option is automatically selected by the gaming machine as the user request. In activity monitoring, the processing facility measures the amount of time spent or money wagered by the player at the gaming machine. This information is stored with the player's gaming account as wagered amounts in time and/or money. The gaming operator can then dispense player bonuses based on these amounts. These embodiments permit a player to open a gaming account without performing any special activity, such as filling out a questionnaire or form provided by the gaming operator to obtain an account or 'house' card of the gaming operator.

If a player has already established a separate gaming account with the gaming operator or used another general purpose charge card with the gaming operator, the general purpose charge card can be linked to the earlier gaming account. In this embodiment, the player inserts the general purpose charge card into, or otherwise provides information concerning the general purpose charge card into the gaming machine and selects the option, "Link Accounts". The display on the gaming machine then queries the player for information concerning the other account. The player can provide this information by providing gaming account or general purpose charge card information. In response to a linkage request 144, the processing facility identifies the existing gaming account 150 and links these cards or accounts to the same gaming account 152. Such linkages can also be entered by a representative of the gaming operator or the player at separate computer terminals or kiosks. Linkage allows winnings or losses from different general purpose charge cards or other cards and accounts to be combined into one gaming account. FIG. 9 illustrates how the information is stored in a gaming account 160 at the processing facility according to one embodiment of this invention. In FIG. 9, the associated data is stored as a variable length record in a computer database, but other implementations of the gaming account are also encompassed by this invention. The gaming account 160 is identified by a gaming account identification 162, such as an account number or the card identification. Linked account identifications 164 are associated with this gaming account. Although the linked account identifications are typically general purpose charge card numbers, the linked account identifications may also be account numbers such as, for example, a frequent flyer account number or another gaming account. The gaming account 160 according to this embodiment is also associated with gaming account status 166, which includes such information as a credit limit 168 for the gaming account and current balances 170 for various subaccounts, for example, the dollar subaccount 172, the bonus points subaccount 174, and the wagering time subaccount 176. Also, although not required, if a player, card or financial institution provides any personal information, for example, name, address, or telephone number, the personal information can also be associated with the gaming account as a player identification 178. In addition, other information 180 can be associated with the gaming account. The gaming account 160 is also associated with the status of the linked accounts 182 which, in turn, are associated with additional information such as the amount of credit approved 184 and the balance 186 with respect to a particular linked account.

Linkage helps establish a credit history of the player and allows the combining of award bonus points. Thus, for example, if a player has a first gaming account opened with one general purpose charge card which has been awarded 5,000 bonus points and a second gaming account opened with another general purpose charge card which has been awarded 5,000 bonus points, the two gaming accounts can be combined into a single gaming account having 10,000 bonus points.

Another embodiment of this invention allows linkage and game play with other types of exchange, for example, frequent flyer miles. In this embodiment, a player can select the kind of playing credit to be used. For example, the player could elect to play games with money, such as dollars, or with frequent flyer miles. Similar to the entry of the general purpose charge card information, the player need only enter the frequent flyer account number. As discussed above, if the types of exchange are not transferrable, the processing facility separates each type into separate gaming subaccounts of the gaming account. For example, a gaming account may have $50, 10,000 frequent flyer miles for one airline, and 5,000 bonus points from a casino in three separate subaccounts. If a particular type of subaccount does not exist in the gaming account 160, a new subaccount is added. Since some general purpose charge cards offer bonus points, the gaming account according to this invention can be credited or debited with the dollars as well as the bonus points earned or lost with the credit or debit. Because one account may permit access to money credits and one or more bonus point credits, the player may be queried through the gaming machine to select which type of exchange is desired or which subaccount to use.

In another aspect of this embodiment, the processing facility can also exchange bonus points in one subaccount for another subaccount. For example, if the casino and the airline allow for transfer of gaming bonus points into frequent flyer miles, the processing facility can offer such an exchange as an option to the player.

While the invention has been described in connection with a preferred embodiment, it is not intended to limit the scope of the invention to the particular form set forth but, on the contrary, it is intended to cover such alternatives, modifications, and equivalents as may be included within the spirit and scope of the invention as defined by the appended claims.

I claim:

1. A method of using information concerning a first account maintained at a first institution for use in playing games of chance played on a gaming machine at a location which is remote from and is different from said first institution, comprising the steps of:

causing information concerning said first account to be received by said gaming machine;

accessing a gaming account having one or more subaccounts at a processing facility based on information concerning said first account;

conditioning said gaming machine in accordance with said gaming account to permit plays thereon;

maintaining information about said plays on said gaming machine; and selectively causing said gaming machine to transmit information respecting said plays to said processing facility for maintaining said gaming account.

2. A method as in claim 1, further comprising the step of: crediting or debiting one or more non-monetary units to one or more gaming subaccounts of said gaming account for each play on said gaming machine.

3. A method as in claim 1, further comprising the step of: exchanging one or more units of one of said subaccounts for one or more units of another of said subaccounts.

4. A method as in claim 1, further comprising the steps of: determining the amount of time said gaming machine is accessed using said gaming account; and crediting said amount of time to a time subaccount of said gaming account.

5. A method as in claim 1, further comprising the steps of: determining the amount of money wagered at said gaming machine accessed using said gaming account; and crediting said amount of money wagered to a wagering subaccount of said gaming account.

6. A method as in claim 1, further comprising the step of: crediting or debiting monetary units to a gaming subaccount of said gaming account for each play on said gaming machine.

7. A method of using information concerning a first account maintained at a first institution for use in playing games of chance played on a gaming machine at a location which is remote from and is different from said first institution, comprising the steps of:

causing information concerning said first account to be received by said gaming machine;

opening a gaming account at a processing facility based on information concerning said first account;

conditioning said gaming machine in accordance with said gaming account to permit plays thereon;

maintaining information about said plays on said gaming machine; and selectively causing said gaming machine to transmit information respecting said plays to said processing facility for maintaining said gaming account.

8. A method as in claim 7, wherein said step of opening a gaming account occurs when a general purpose charge card account is accessed through said processing facility.

9. A method as in claim 7, wherein said step of opening said gaming account is performed at a machine which is remote from said gaming machine.

10. A method of using information concerning a first account maintained at a first institution for use in playing games of chance played on a gaming machine at a location which is remote from and is different from said first institution, comprising the steps of:

causing information concerning said first account to be received by said gaming machine;

accessing a gaming account at a processing facility based on information concerning said first account;

conditioning said gaming machine in accordance with said gaming account to permit plays thereon;

maintaining information about said plays on said gaming machine;

selectively causing said gaming machine to transmit information respecting said plays to said processing facility for maintaining said gaming account; and linking one or more accounts maintained by one or more institutions with said gaming account.

11. A method as in claim 10, wherein said step of linking one or more accounts further comprises the steps of:

causing information concerning said first account to be received by said gaming machine;

selecting a linking option at said gaming machine;

causing information concerning one or more second accounts to be received by said gaming machine; and relating information concerning said first account and said second accounts to said gaming account.

12. A method as in claim 10, further comprising the step of:

selecting an accessing option for said gaming account, said option selected from the group consisting of: requesting credit, requesting account linkage, requesting a wagering unit, requesting activity monitoring and requesting changes to information stored in said gaming account.

13. A method as in claim 12, wherein said option is a default option automatically selected when plays are performed on said gaming machine without an explicit selection.

14. An apparatus for using information concerning a first account maintained at a first institution for enabling games of chance to be played on a gaming machine at a location which is remote from and is different from said first institution, comprising:

means for causing information concerning said first account to be received by said gaming machine;

means for accessing a gaming account at a processing facility based on information concerning said first account;

means for conditioning said gaming machine in accordance with said gaming account to permit plays thereon;

means for maintaining information about said plays on said gaming machine; and means for selectively causing said gaming machine to transmit information respecting said plays to said processing facility for maintaining said gaming account;

said gaming account having one or more subaccounts.

15. An apparatus as in claim 14, further comprising:

means for crediting or debiting one or more wagering units to one or more gaming subaccounts of said gaming account for each play on said gaming machine.

16. An apparatus as in claim 14, further comprising:

means for exchanging one or more units of one of said subaccounts for one or more units of another of said subaccounts.

17. An apparatus as in claim 14, further comprising:

means for determining the amount of time said gaming machine is accessed using said gaming account; and means for crediting said amount of time to a time subaccount of said gaming account.

18. An apparatus as in claim 14, further comprising:

means for determining the amount of money wagered at said gaming machine accessed using said gaming account; and means for crediting said amount of money wagered to a wagering subaccount of said gaming account.

19. An apparatus according to claim 15, wherein said wagering unit is a non-monetary unit.

20. An apparatus according to claim 15, wherein said wagering unit is selected from the group consisting of: frequent flyer miles, credit card bonus points, customer bonus points and sample gaming points.

21. An apparatus according to claim 14, wherein said gaming account comprises:

a gaming account identification;

one or more linked account identifications; and gaming account status information.

22. An apparatus according to claim 21, wherein said gaming account status information further comprises:

a credit limit;

one or more subaccount informations;

a player identification; and other information.

23. An apparatus according to claim 22, wherein two or more of said subaccount informations are represented in different wagering units.

24. An apparatus according to claim 21, wherein said gaming account further comprises:

one or more linked account status informations, each of said informations further comprising a credit limit and a balance.

25. An apparatus for using information concerning a first account maintained at a first institution for enabling games of chance to be played on a gaming machine at a location which is remote from and is different from said first institution, comprising:

means for causing information concerning said first account to be received by said gaming machine;

means for opening a gaming account at a processing facility based on information concerning said first account;

means for conditioning said gaming machine in accordance with said gaming account to permit plays thereon;

means for maintaining information about said plays on said gaming machine; and means for selectively causing said gaming machine to transmit information respecting said plays to said processing facility for maintaining said gaming account.

26. An apparatus as in claim 25, wherein said means for opening a gaming account is performed from a machine which is remote from said gaming machine.

27. An apparatus for using information concerning a first account maintained at a first institution for enabling games of chance to be played on a gaming machine at a location which is remote from and is different from said first institution, comprising:

means for causing information concerning said first account to be received by said gaming machine;

means for accessing a gaming account at a processing facility based on information concerning said first account;

means for conditioning said gaming machine in accordance with said gaming account to permit plays thereon;

means for maintaining information about said plays on said gaming machine;

means for selectively causing said gaming machine to transmit information respecting said plays to said processing facility for maintaining said gaming account; and means for linking one or more accounts maintained by one or more institutions with said gaming account.

28. An apparatus as in claim 27, wherein said means for linking further comprises:

means for causing information concerning said first account to be received by said gaming machine;

means for selecting a linking option at said gaming machine;

means for causing information concerning one or more second accounts to be received by said gaming machine; and means for relating information concerning said first account and said second accounts to said gaming account.

29. An apparatus as in claim 27, further comprising means for selecting an accessing option for said gaming account, said option selected from the group consisting of: requesting credit, requesting account linkage, requesting a wagering unit, requesting activity monitoring and requesting changes to information stored in said gaming account.

30. An apparatus as in claim 29, wherein said option is a default option.

* * * * *